United States Patent [19]

Mellen

[11] 3,771,607
[45] Nov. 13, 1973

[54] TWO-WAY PLOW
[75] Inventor: William F. Mellen, Anaheim, Calif.
[73] Assignee: Alice M. Mellen, Anaheim, Calif.
[22] Filed: June 13, 1972
[21] Appl. No.: 262,356

[52] U.S. Cl. ............... 172/212, 172/225, 172/383, 172/671
[51] Int. Cl. .......................... A01b 3/34, A01b 3/46
[58] Field of Search ................. 172/212, 224, 225, 172/383–386, 671

[56] References Cited
UNITED STATES PATENTS

| | | | |
|---|---|---|---|
| 2,017,873 | 10/1935 | Strandlund | 172/212 |
| 2,704,017 | 3/1955 | Wilson | 172/383 |
| 2,845,014 | 7/1958 | Pursche | 172/212 X |
| 2,916,097 | 12/1959 | Miller | 172/212 |
| 3,319,721 | 5/1967 | Keplinger et al. | 172/212 |
| 3,527,306 | 9/1970 | Richey | 172/212 |
| 3,532,172 | 10/1970 | Richey | 172/212 |

FOREIGN PATENTS OR APPLICATIONS

| | | | |
|---|---|---|---|
| 609,527 | 5/1956 | Germany | 172/224 |

*Primary Examiner*—Robert E. Pulfrey
*Assistant Examiner*—Paul T. Sewell
*Attorney*—William C. Babcock

[57] ABSTRACT

A multi-bottom turn over plow has a longitudinal tube which forms its main frame, and this frame is supported at one end by a hitch and lifting mechanism. At its rear end, the frame is supported by a tail wheel which may be removed if desired and additional plow bottoms added as required. Also a second trailing wheel is mounted on the frame and may be hydraulically actuated to raise and to support the plow assembly. Also the tail wheel is limited in its rotational movement relative to the mounted tube by means of stop lugs appropriately positioned.

9 Claims, 15 Drawing Figures

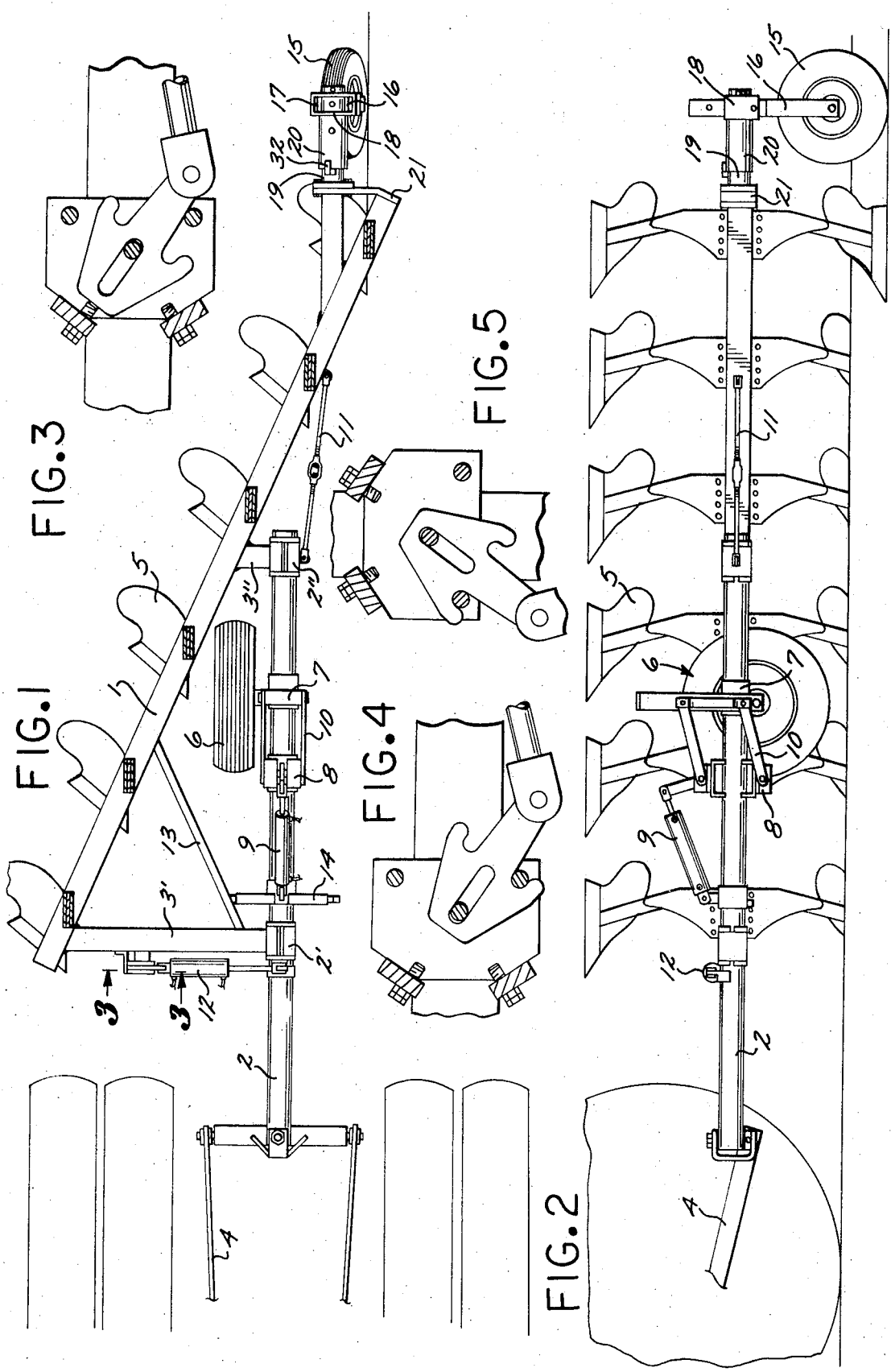

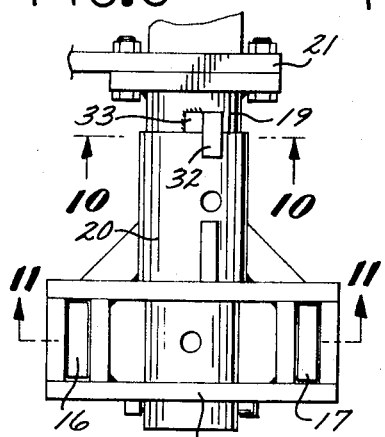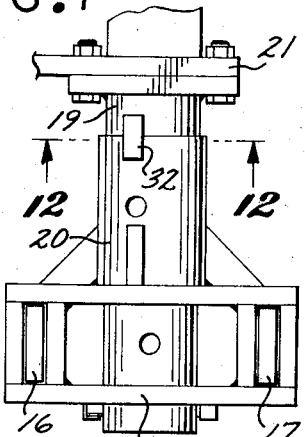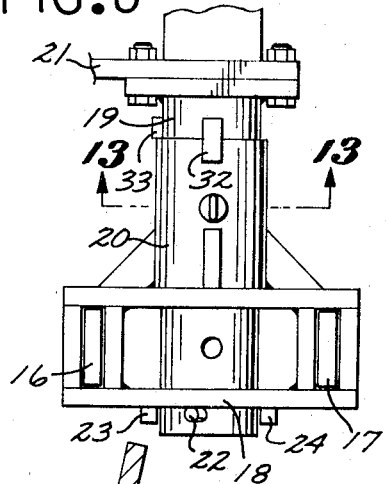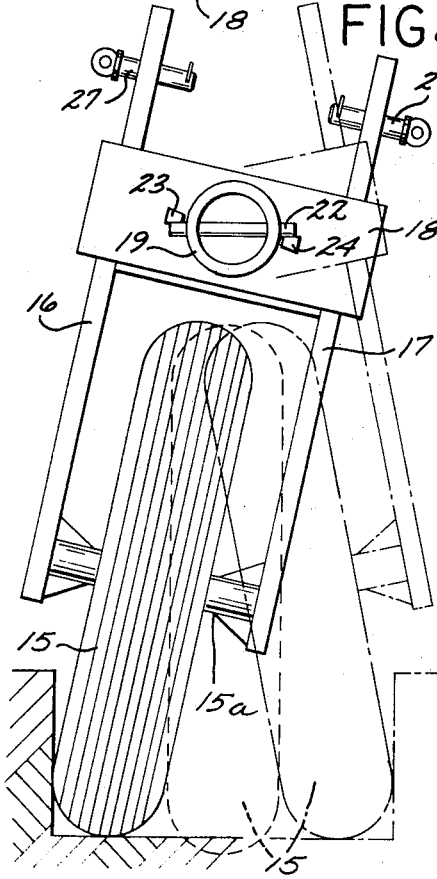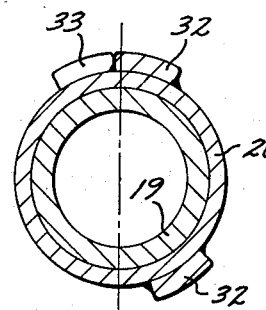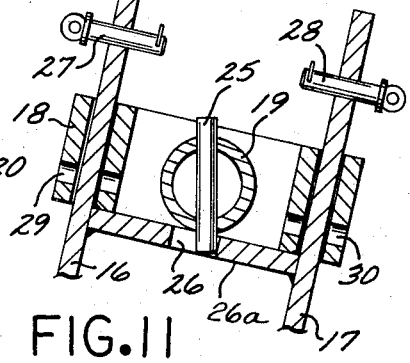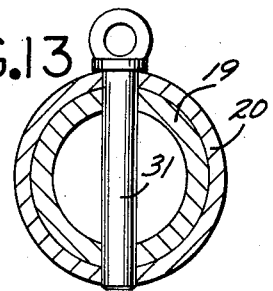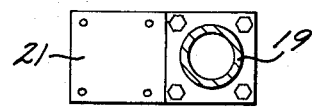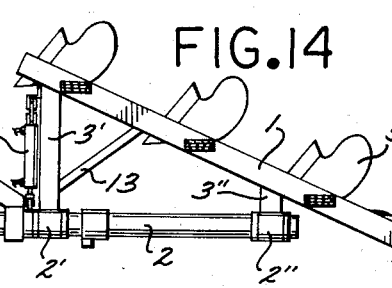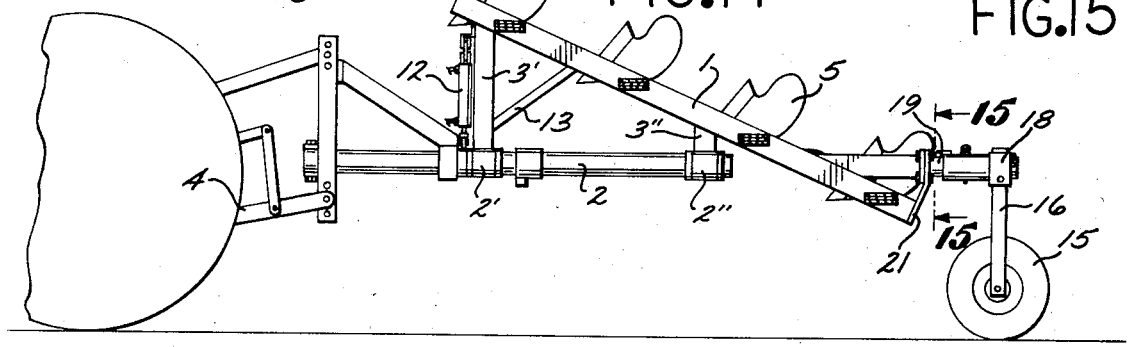

TWO-WAY PLOW

An object of my invention is to provide a supporting wheel by means of which the plow bottoms may be lifted out of the ground to permit rotation. Also the center wheel may be used as a depth control for the plow and also to transport the same.

Another object of my invention is to permit the mounted plow to be lifted by the tractor-lift arms to thus raise the plow out of the ground for rotation, and also to permit bolting the plow in angular position.

Still another object of my invention is to so mount the tail wheel that it will run in the corner of the furrow, thus preventing side draft from the pressure of the plow bottoms.

Still another object of my invention is to so mount the tail wheel that it does not have to be in direct line with the main plow shaft. The tail wheel can be placed in position by welding its braces or mounted arms on the frame 1 at the end of the rear most plow bottom, whether the plow bottom be a four, five, or six bottom plow.

Another feature of my invention is that the tail wheel will always run in the furrow regardless of the number of bottoms on the plow.

Other objects, advantages and features of invention may appear from the accompanying drawings, the subjoined detailed description and the appended claims.

In the drawings:

FIG. 1 is a top plan view of my two-way plow.

FIG. 2 is a side elevation of the same.

FIG. 3 is a plan view of the actuating mechanism.

FIG. 4 is another view of the actuating mechanism in another position.

FIG. 5 is a plan view of the actuating mechanism in still another position.

FIG. 6 is a fragmentary plan view of the tail wheel mount.

FIG. 7 is a fragmentary plan view of still another position of the tail wheel mount.

FIG. 8 is a fragmentary plan view of still another view of the tail wheel mount.

FIG. 9 is a rear view of the tail wheel and its mount, showing the successive movements of the wheel mount between opposite working and transport positions.

FIG. 10 is a sectional view taken on line 10—10 of FIG. 6.

FIG. 11 is a sectional view taken on line 11—11 of FIG. 6.

FIG. 12 is a sectional view taken on line 12—12 of FIG. 7.

FIG. 13 is a sectional view taken on line 13—13 of FIG. 8.

FIG. 14 is a fragmentary side elevation of the plow bottoms in transporting position.

FIG. 15 is a sectional view taken on line 15—15 of FIG. 14.

Referring more particularly to the drawings, my two-way plow includes a frame 1, substantially A shaped, and the frame includes a mounting tube 2, a frame 1 is secured to the tube 2 by bearings 2' and 2" attached to column 3' and 3" which frame 1 rotates thereon. The tube 2 is attached to the tractor by a bracket and pivot pin connected to the draw bar of the draft links 4, as shown in FIGS. 1, 2, and 14. A plurality of plow bottoms 5 are mounted on the frame 1, and will rotate with the frame 1 as the hydraulic actuator 12 is manipulated by the tractor operator.

A mid-wheel 6 is journaled on the non-rotating tube 2 by the bearings 7 and 8. A hydraulic cylinder 9 is connected to the mid-wheel 6 through the linkage 10, and the wheel can then be raised or lowered vertically to support the frame 1 and the tube 2, as well as the load thereon if found necessary. As the number of plow bottoms are decreased, it will be correspondingly unnecessary to utilize a mid-wheel 6. A rear wheel alone will then be required, as shown in FIG. 14.

If a large number of plow shares are mounted on the frame 1, as shown in FIG. 1, it may be necessary to provide a tension bar 11 which is attached at either end to the rear of the tube 2 and to the frame 1. To rotate the plow frame 1, in order to move the plow shares 5 into operating position, I provide a hydraulic cylinder 12, as best shown in FIG. 1. In order to support the frame 1 in either of two positions (spaced 180 degrees apart), I provide a strut 13 which extends between the frame 1 and column 3, as the frame 1 is rotated from one operating position 180 degrees to the opposite operating position. The strut 13 comes to rest on either end of bracket 14, which carries adjustable stop pads for leveling the plow frame 1.

The rear wheel 15 is rotatably mounted on a transverse shaft 15a, which fork includes the arms 16 and 17. The arms 16 and 17 are slidably mounted in the box 18, which box is journaled on the extension shaft 19 which projects rearwardly beyond the tube 2 and is fixedly attached to the frame 1. The sleeve 20, on the box 18, serves as a mounting means for the rear wheel 15. As shown in FIG. 9, the tail wheel 15 can rotate thru an arc of approximately 12° to the left and approximately 12° to the right. Thus controlling the rotative movement of the tail wheel. The extension shaft 19 is bolted to the plate 21, as shown in FIGS. 6, 7, and 8. To limit the tail wheel 15 to an arc of approximately 12° left and approximately 12 degrees right, I provide a pin 22 which moves between the stop lugs 23 and 24 projecting from the box 18 which prevents sleeve 20 from sliding off of extension shaft 19. A second pin 25 projects into a slot 26 in the cross member 26 a of the arms 16 and 17 of the wheel fork, and this pin can swing back and forth to again assist in limiting the wheel movement to a total arc of approximately 24° By raising the rear wheel fork arms 16 and 17, the cross member of the arms 16 and 17 will strike the bottom of extension shaft 19 which will limit the vertical movement of wheel 15. By removing the pins 27 and 28, the box 18 as well as the wheel 15 can be moved further in a vertical direction until the pins 27 and 28 can be pushed thru the holes 29 and 30, as shown in FIG. 11. This enables the plow assembly to be elevated to a position where the plow can be transported on a road. To prevent the wheel 15 from swinging from side to side while being transported on a road, I provide a pin 31 which extends thru the sleeve 20 and shaft 19, as shown in FIG. 13.

As previously stated, the plow 5 can be moved into either of two positions which are 180 degrees apart. Thus shaft 19 must rotate in the sleeve 20 thru an arc of 180°. Thus the sleeve 20 and the box 18, in which the fork 16 and 17 is mounted, can rotate thru an arc of approximately 24° to permit the wheel 15 to swing thru the limited arc. Thus the sleeve 20 is limited to this movement by the lug 32 which engages the lug 33.

FIGS. 3, 4, and 5 illustrate an hydraulic actuator for rotating the plow assembly.

When the plow assembly is raised, the tail wheel 15 drops to unlock the pin 25 from the slow 26. After the plow is rotated, the plow is lowered to the ground at which time the tail wheel 15 is raised by contacting the ground. This again locks the pin 25 in the slot 26, and the lugs 32 on the collar 20 are locked in a tilted position by the lug 33, which is welded to the stub shaft 19. The tail wheel 15 does not have to be placed in direct line with the main plow shaft 2. It can be placed in position on the bracket 21 at the rear end of the last plow bottom. The tail wheel 15 will always be placed where it will run in the furrow, regardless of the number of bottoms on the plow.

Having described my invention, I claim:

1. The combination with a two way plow, provided with an elongate frame that is pivotally connected on the forward end thereof to a vertically movable hitch of a power vehicle in such a manner as to tend to remain substantially horizontal as said hitch is moved veritcally, a plow bottom supporting assembly pivotally supported from said frame, first power operated means for pivoting said plow bottom supporting assembly to either first or second positions on opposite sides of said frame when said frame is in a first upper position that is of sufficient elevation above the ground that said plow bottom assembly is not in contact therewith, of a rear wheel assembly that is automatically positioned in first or second angular positions above the ground when said plow bottom supporting assembly moves to said first or second positions, said rear wheel assembly when said plow bottom supporting assembly is lowered in said first or second position to dispose the plow bottoms thereof in plowing engagement with the ground serving to so engage the ground as to counteract the side thrust exerted on said frame as said plow bottoms are drawn through the ground to plow the latter, said rear wheel assembly comprising;
   a. a shaft rigidly secured to said plow bottom supporting assembly rearwardly of said frame and parallel to the latter;
   b. a rear wheel;
   c. first means for pivotally and freely supporting said rearwheel below said shaft for limited transverse pivoting relative thereto, with the angle of said transverse pivoting being substantially less than the transverse angle through which said plow bottom supporting assembly moves when pivoting between said first and second positions, said first means including:
      1. a box pivotally supported in a transverse position on said shaft;
      2. two laterally spaced fork members secured to said box, and with at least portions of said fork members extending downwardly from said box; and
      3. a transverse shaft extending between said fork members below said box that rotatably supports said rearwheel.
   d. first stop means on said shaft that pivot therewith as said plow bottom supporting assembly pivots between said first and second positions; and
   e. second stop means on said first means that are so operatively associated with said first stop means that said rearwheel assembly is pivoted to said first or second angular position concurrently with said plow bottoms supporting assembly moving to said first or second position.

2. The combination as defined in claim 1 in which said first stop means are two diametrically opposed rigid protuberances that extend outwardly from said shaft.

3. The combination as defined in claim 2 in which said second stop means are two laterally spaced lugs that extend outwardly from said box, each of said lugs having first and second oppositely disposed faces, with said protuberances being in contact with said first faces when said rear wheel assembly is in said first angular position and said protuberances in contact with said second faces when said rear wheel assembly is in said second angular position.

4. The combination as defined in claim 2 in which said protuberances are defined by opposite end portions of a pin that extends transversely through the shaft.

5. The combination as defined in claim 2 in which said fork members are slidably supported in said box and said combination in addition including:
   h. a cross member that extends btween said fork members below said frame and on which said frame rests when said rear wheel assembly is in either said first or second angular positions and said frame is lowered sufficiently to place said plow bottom supporting assembly in a plowing position; and
   i. third stop means on said fork member above said box to prevent said fork members from being disengaged from said box when said frame is moved to said first upper position.

6. The combination as defined in claim 1 which in addition includes:
   h. a sleeve rotatably mounted on said shaft, said sleeve rigidly secured to said box, said first stop means being a single lug rigidly secured to said shaft, with said second stop means being two circumferentially spaced second lugs rigidly secured to said sleeve and projecting longitudinally therefrom, and the longitudinal projecting portions of said second lugs transversely aligned with said first lug.

7. The combination as defined in claim 6 which in addition includes:
   i. third means for removably locking said sleeve in a non-rotatable position relative to said shaft to dispose said rear wheel in a fixed vertical position when said two way plow is being transported from one field to another field.

8. The combination as defined in claim 6 in which said third means is a pin that removably engages diametrically aligned first and second openings defined in said sleeve and shaft respectively.

9. The combination defined in claim 1 which in addition includes:
   f. a mid wheel assembly intermediate the ends of said frame; and
   g. second power means to raise and lower said mid wheel assembly, with said mid wheel assembly at least partially supporting the weight of said two way plow when in a lowered position and with said frame in said first upper position.

* * * * *